(12) United States Patent
Peng et al.

(10) Patent No.: US 11,303,094 B2
(45) Date of Patent: Apr. 12, 2022

(54) OPTICAL AMPLIFIER USING A SINGLE INPUT PUMP LASER AND HAVING A SWITCHABLE GAIN RANGE FOR FIBER-OPTIC COMMUNICATION

(71) Applicant: AOC Technologies (Wuhan) Co., Ltd., Wuhan (CN)

(72) Inventors: Jiyu Peng, Wuhan (CN); Lei Hu, Wuhan (CN); Lijie Qiao, Ottawa (CA)

(73) Assignee: AOC Technologies (Wuhan) Co., Ltd., Wuhan (CN)

( * ) Notice: Subject to any disclaimer, the term of this patent is extended or adjusted under 35 U.S.C. 154(b) by 440 days.

(21) Appl. No.: 16/542,477

(22) Filed: Aug. 16, 2019

(65) Prior Publication Data
US 2020/0295526 A1 Sep. 17, 2020

(30) Foreign Application Priority Data

Mar. 13, 2019 (CN) .......................... 201910188196.4

(51) Int. Cl.
| | |
|---|---|
| *H01S 3/23* | (2006.01) |
| *H01S 3/094* | (2006.01) |
| *H01S 3/067* | (2006.01) |
| *H01S 3/16* | (2006.01) |
| *H04B 10/50* | (2013.01) |
| *H04B 10/67* | (2013.01) |
| *H04B 10/25* | (2013.01) |

(52) U.S. Cl.
CPC ........ *H01S 3/2316* (2013.01); *H01S 3/06766* (2013.01); *H01S 3/094003* (2013.01); *H01S 3/1608* (2013.01); *H04B 10/25891* (2020.05); *H04B 10/503* (2013.01); *H04B 10/67* (2013.01); *H01S 2301/02* (2013.01); *H01S 2301/04* (2013.01)

(58) Field of Classification Search
None
See application file for complete search history.

(56) References Cited

U.S. PATENT DOCUMENTS

| | | | | |
|---|---|---|---|---|
| 5,430,572 | A * | 7/1995 | DiGiovanni | ........ H01S 3/06758 359/341.33 |
| 6,151,338 | A * | 11/2000 | Grubb | ................. H01S 3/10023 372/6 |
| 6,583,925 | B1 * | 6/2003 | Delavaux | ............ H01S 3/06754 359/341.32 |
| 9,699,531 | B2 * | 7/2017 | Shukunami | ........ H04Q 11/0005 |
| 2013/0120831 | A1 * | 5/2013 | McClean | ............. H04B 10/294 359/341.3 |

(Continued)

*Primary Examiner* — Eric L Bolda
(74) *Attorney, Agent, or Firm* — Young Basile Hanlon & MacFarlane, P.C.

(57) ABSTRACT

An optical amplifier includes two amplifier stages, a circulator and an output stage. The first amplifier stage amplifies an input optical signal, and provides a first-stage amplified optical signal that is to be outputted via the circulator to the second amplifier stage. The second amplifier stage amplifies the first-stage amplified optical signal, and outputs a second-stage amplified optical signal to the output stage. The output stage outputs a returned optical signal to the second amplifier stage, so that the second amplifier stage amplifies the returned optical signal, and provides a third-stage amplified optical signal that is to be outputted via the circulator and the output stage to serve as an output optical signal.

18 Claims, 5 Drawing Sheets

(56) References Cited

U.S. PATENT DOCUMENTS

| | | | |
|---|---|---|---|
| 2014/0177037 A1* | 6/2014 | Sridhar | H04B 10/293 359/337.12 |
| 2015/0180196 A1* | 6/2015 | Wang | H04B 10/2941 359/341.3 |
| 2017/0054268 A1* | 2/2017 | Okada | H01S 3/1618 |

* cited by examiner

OPTICAL AMPLIFIER USING A SINGLE INPUT PUMP LASER AND HAVING A SWITCHABLE GAIN RANGE FOR FIBER-OPTIC COMMUNICATION

CROSS-REFERENCE TO RELATED APPLICATION(S)

This application claims priority to and benefit of Chinese Patent Application No. 201910188196.4, filed on Mar. 13, 2019, the entire disclosure of which is hereby incorporated by reference.

TECHNICAL FIELD

The disclosure relates to an optical amplifier having a switchable gain range, and more particularly to an optical amplifier using a single input pump laser and having a switchable gain range for fiber-optic communication.

BACKGROUND

Optical amplifiers can be used to extend transmission distance of an optical signal in fiber-optic communication. Optical fiber cables, each coupled between two optical amplifiers, generally have different lengths. In order to reduce influence of the different lengths on the transmission distance and to dynamically adjust gain, the optical amplifiers must have a wide gain range.

Figure 1:
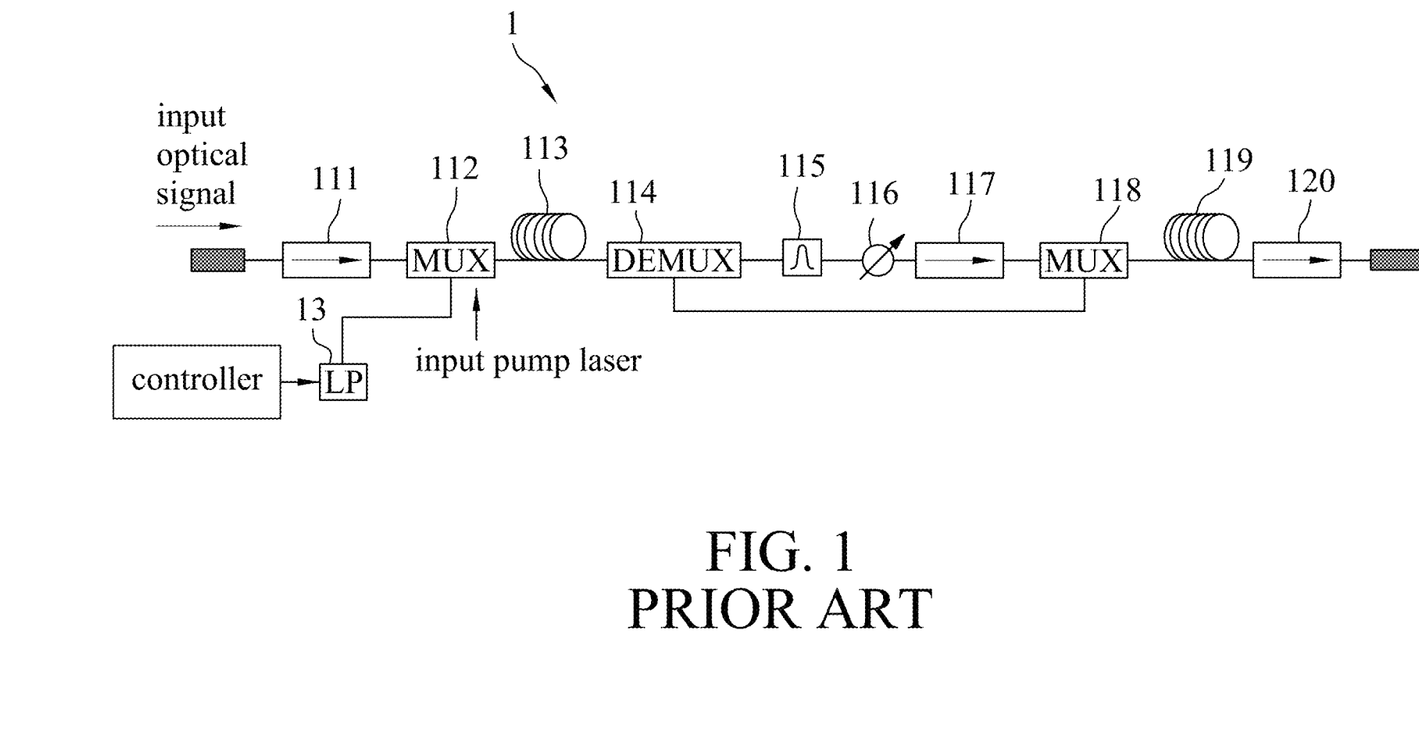
FIG. 1 is a circuit block diagram illustrating a first conventional optical amplifier that has a single gain range.

FIG. 1 illustrates a first conventional optical amplifier 1. The first conventional optical amplifier 1 includes a first amplifier stage (including an isolator 111, a multiplexer (MUX) 112, an erbium doped fiber 113 and a demultiplexer (DEMUX) 114) and a second amplifier stage (including a filter 115, a variable attenuator 116, an isolator 117, a multiplexer 118, an erbium doped fiber 119 and an isolator 120). An input optical signal undergoes in sequence amplification by the first amplifier stage and amplification by the second amplifier stage so as to generate an output optical signal. The first conventional optical amplifier 1 further includes a laser pump (LP) 13 that generates an input pump laser which is to be pumped into the erbium doped fibers 113, 119. The first conventional optical amplifier 1 has a narrow gain range. Two first conventional optical amplifiers 1 that have different gain ranges can be used to form a modified optical amplifier that has a wide gain range.

Figure 2:
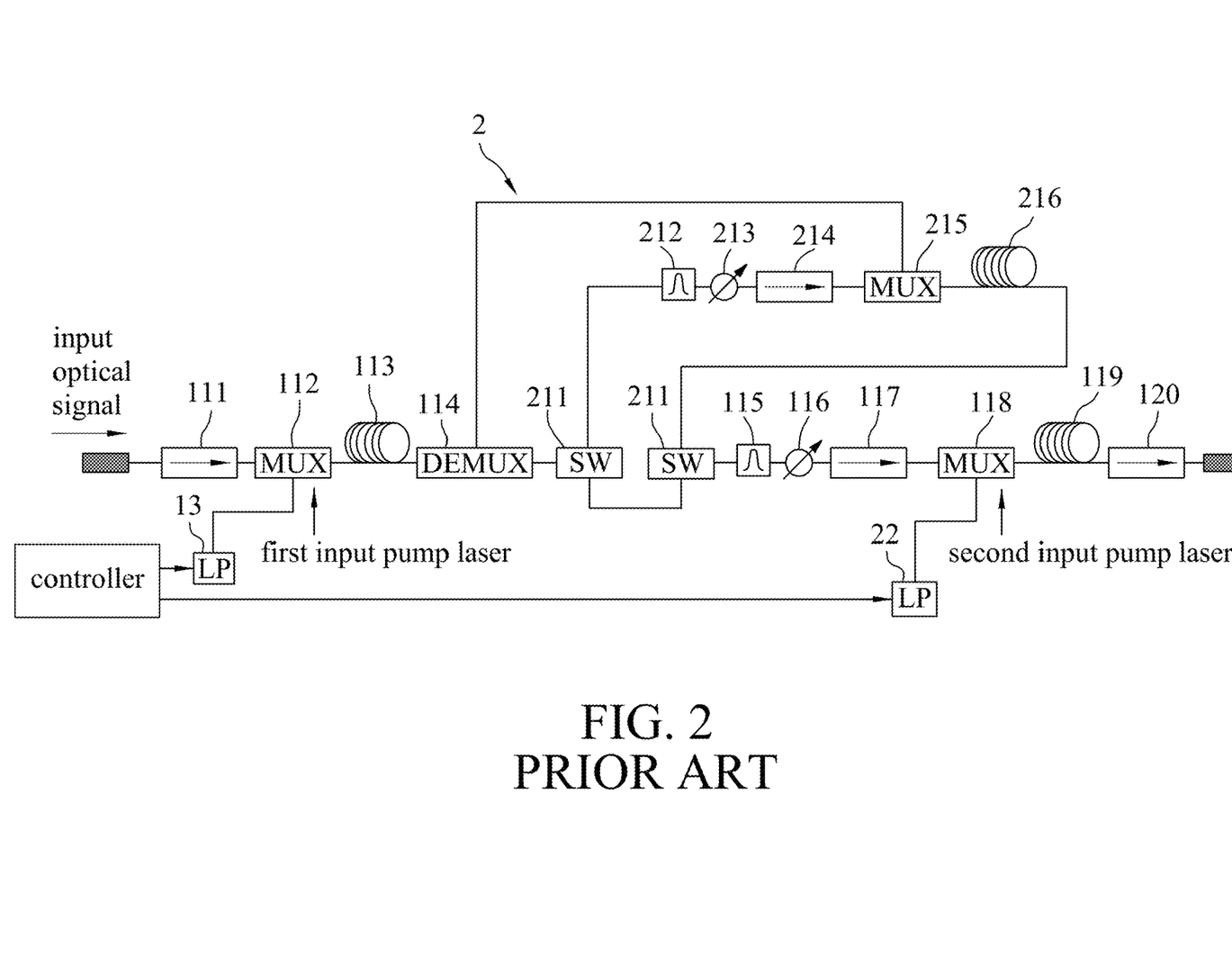
FIG. 2 is a circuit block diagram illustrating a second conventional optical amplifier that has two different gain ranges.

FIG. 2 illustrates a second conventional optical amplifier 2 that is operable in one of two amplification modes which include a low gain range amplification mode and a high gain range amplification mode. The second conventional optical amplifier 2 is similar to the first conventional optical amplifier 1, and differs from the first conventional optical amplifier 1 in that the second conventional optical amplifier 2 further includes two 1×2 switches 211, a third amplifier stage (including a filter 212, a variable attenuator 213, an isolator 214, a multiplexer 215 and an erbium doped fiber 216) and another laser pump 22. When the second conventional optical amplifier 2 operates in the low gain range amplification mode, the 1×2 switches 211 are switched in such a way that an input optical signal undergoes in sequence amplification by the first amplifier stage and amplification by the second amplifier stage so as to generate an output optical signal, thereby resulting in a low gain range. When the second conventional optical amplifier 2 operates in the high gain range amplification mode, the 1×2 switches 211 are switched in such a way that the input optical signal undergoes in sequence amplification by the first amplifier stage, amplification by the third amplifier stage and amplification by the second amplifier stage so as to generate the output optical signal, thereby resulting in a high gain range. The laser pump 13 generates a first input pump laser that is to be pumped into the erbium doped fibers 113, 216. The laser pump 22 generates a second input pump laser that is to be pumped into the erbium doped fiber 119. The second conventional optical amplifier 2 is switchable between the low and high gain range amplification modes, and therefore has a wide gain range. As compared to the aforesaid modified optical amplifier formed by the first conventional optical amplifier 1 (see FIG. 1), the second conventional optical amplifier 2 includes less elements, and therefore has a lower cost and a smaller volume. In addition, the second conventional optical amplifier 2 has high control complexity.

As fiber-optic communication technology advances, there is a need to further reduce the cost and the volume of the optical amplifier, and to reduce the control complexity of the optical amplifier.

SUMMARY

Therefore, an object of the disclosure is to provide an optical amplifier that can have a wide gain range, a low cost, a small volume and low control complexity.

According to the disclosure, the optical amplifier is operable in an amplification mode, and includes a first amplifier stage, a circulator, a second amplifier stage and an output stage. The first amplifier stage is for receiving an input optical signal and an input pump laser that are different from each other in wavelength, uses the input pump laser to amplify the input optical signal, and outputs a first-stage amplified optical signal that is related to the input optical signal and a bypass pump laser that is related to the input pump laser. The circulator has a first terminal that is coupled to the first amplifier stage for receiving the first-stage amplified optical signal therefrom, a second terminal and a third terminal, and outputs the first-stage amplified optical signal at the second terminal thereof. The second amplifier stage is coupled to the first amplifier stage and the second terminal of the circulator for receiving the bypass pump laser and the first-stage amplified optical signal respectively therefrom. The second amplifier stage uses the bypass pump laser to amplify the first-stage amplified optical signal, and outputs a second-stage amplified optical signal that is related to the first-stage amplified optical signal. The output stage is coupled to the second amplifier stage for receiving the second-stage amplified optical signal therefrom, and is coupled further to the third terminal of the circulator. When the optical amplifier operates in the amplification mode, the output stage performs the following: outputting, to the second amplifier stage, a returned optical signal that is related to the second-stage amplified optical signal, so that the second amplifier stage amplifies the returned optical signal and outputs a third-stage amplified optical signal to the second terminal of the circulator, and the circulator outputs the third-stage amplified optical signal at the third terminal thereof; receiving the third-stage amplified optical signal from the third terminal of the circulator; and outputting the third-stage amplified optical signal to serve as an output optical signal, so that a gain of the output optical signal to the input optical signal is within a gain range.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
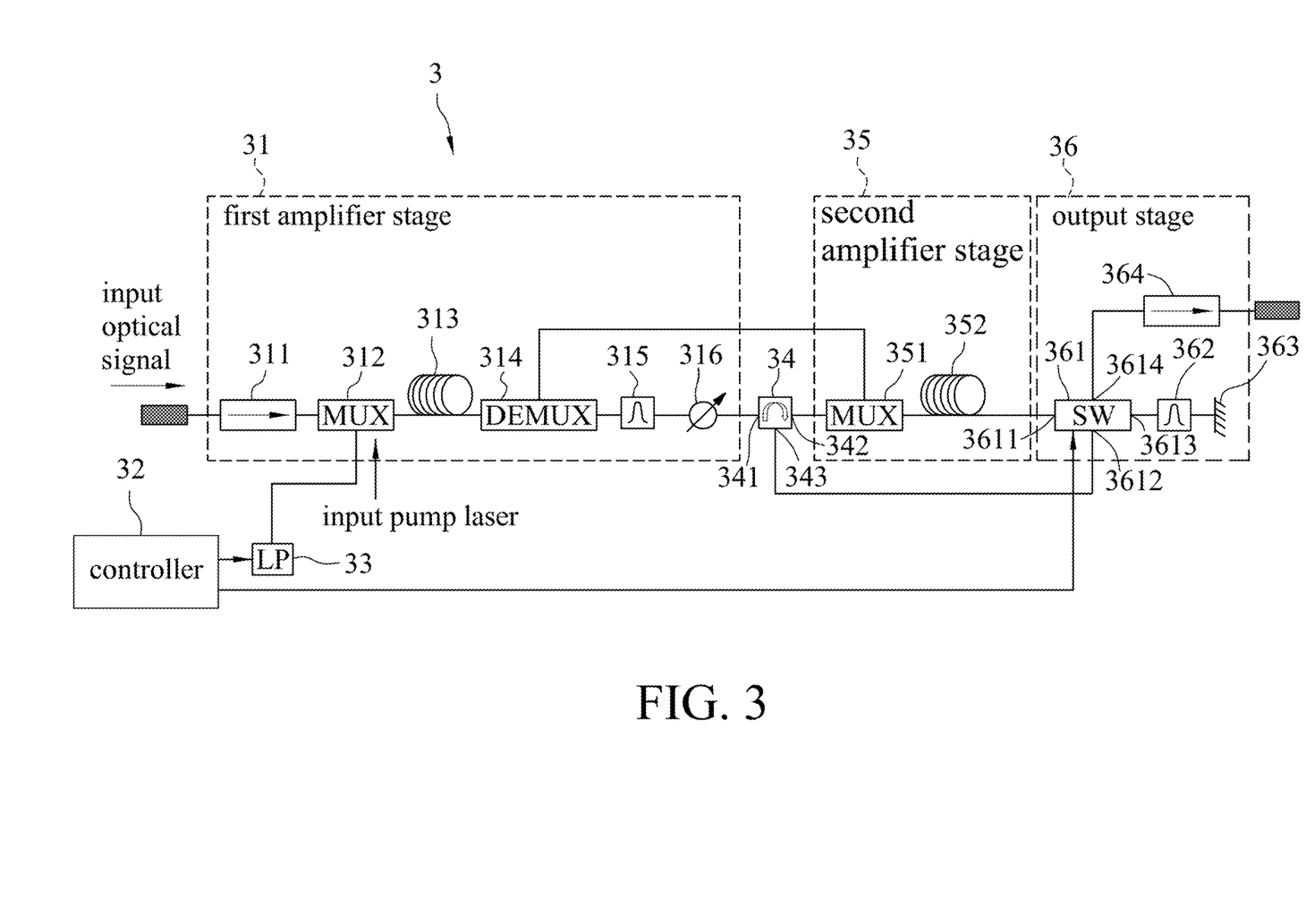
FIG. 3 is a circuit block diagram illustrating an embodiment of an optical amplifier according to the disclosure.

Referring to FIG. 3, an embodiment of an optical amplifier 3 according to the disclosure is adapted to amplify an input optical signal that has at least one wavelength in the conventional wavelength band (C-band). In other words, the optical amplifier 3 of this embodiment has a gain bandwidth of about 35 nm (about from 1530 nm to 1565 nm). However, the disclosure is not limited thereto.

The optical amplifier 3 of this embodiment is operable in one of two amplification modes that include a first amplification mode (also referred to as a high gain range amplification mode in this embodiment) and a second amplification mode (also referred to as a low gain range amplification mode in this embodiment). The optical amplifier 3 of this embodiment includes a first amplifier stage 31, a controller 32, a laser pump 33, a circulator 34, a second amplifier stage 35 and an output stage 36.

The laser pump 33 is controlled by the controller 32, and outputs a high-power input pump laser that is different from the input optical signal in wavelength. The input pump laser may have a wavelength of 980 nm or 1480 nm, but the disclosure is not limited thereto. In this embodiment, the wavelength of the input pump laser is 980 nm.

It should be noted that, in this embodiment, the input pump laser is outputted from the laser pump 33 dedicated to the optical amplifier 3. However, in other embodiments, the input pump laser may be outputted from a laser pump shared by the optical amplifier 3 and another optical amplifier.

The first amplifier stage 31 is for receiving the input optical signal, and is coupled to the laser pump 33 for receiving the input pump laser therefrom. The first amplifier stage 31 uses the input pump laser to amplify the input optical signal, and outputs a first-stage amplified optical signal and a bypass pump laser. The first-stage amplified optical signal is related to the input optical signal, and the bypass pump laser is related to the input pump laser.

In this embodiment, the first amplifier stage 31 includes an isolator 311, a multiplexer (MUX) 312, an erbium doped fiber 313, a demultiplexer (DEMUX) 314, a gain flattening filter 315 and a variable attenuator 316.

The isolator 311 has an input terminal that is for receiving the input optical signal, and an output terminal, and allows one-way transmission of the input optical signal from the input terminal thereof to the output terminal thereof. In this embodiment, the isolator 311 is a birefringent crystal based isolator, and has a (power) insertion loss of about 0.3 dB.

The multiplexer 312 (e.g., a wavelength division multiplexer) is coupled to the output terminal of the isolator 311 and the laser pump 33 for receiving the input optical signal and the input pump laser respectively therefrom, and combines the input optical signal and the input pump laser to generate a first combined optical signal. In this embodiment, the multiplexer 312 is a coated passive element, and has a (power) insertion loss of about 0.25 dB.

The first combined optical signal has a first component that corresponds to the input pump laser, and a second component that corresponds to the input optical signal. The erbium doped fiber 313 is coupled to the multiplexer 312 for receiving the first combined optical signal therefrom, is excited by the first component to amplify the second component, and outputs a boosted optical signal that includes the first component and a result of the amplification of the second component. In this embodiment, the erbium doped fiber 313 is a short optical fiber that is doped with erbium for amplifying an optical signal, has a gain that is within a range from 15 dB to 27 dB in the C-band, and has a gain versus wavelength characteristic that is not flat in the C-band.

It should be noted that the isolator 311 can prevent transmission of reverse amplified spontaneous emission (ASE) (which is emitted by the erbium doped fiber 313 when amplifying the input optical signal) from the output terminal thereof to the input terminal thereof, therefore preventing any influence of the reverse ASE on the input optical signal.

The demultiplexer 314 (e.g., a wavelength division demultiplexer) is coupled to the erbium doped fiber 313 for receiving the boosted optical signal therefrom. The demultiplexer 314 splits the boosted optical signal into a split optical signal that corresponds to the result of the amplification of the second component of the first combined optical signal, and the bypass pump laser that corresponds to the first component of the first combined optical signal. Therefore, the bypass pump laser has a wavelength of 980 nm, the same as that of the input pump laser, and a power level related to that of the input pump laser. In this embodiment, the demultiplexer 314 is a coated passive element, and has a (power) insertion loss of about 0.3 dB.

The gain flattening filter 315 is coupled to the demultiplexer 314 for receiving the split optical signal therefrom, and performs gain flattening compensation on the split optical signal to generate a first filtered optical signal. The gain flattening filter 315 cooperates with the erbium doped fiber 313 to provide a gain versus wavelength characteristic that is substantially flat in the C-band. In this embodiment, the gain flattening filter 315 is a coated passive element, and has a (power) insertion loss of about 0.5 dB.

The variable attenuator 316 is coupled to the gain flattening filter 315 for receiving the first filtered optical signal therefrom, and attenuates the first filtered optical signal by a variable amount to generate the first-stage amplified optical signal. In this embodiment, the variable attenuator 316 can attenuate the first filtered optical signal by 0 dB to 25 dB, and has a (power) insertion loss of about 0.8 dB.

The controller 32 outputs a pump control signal to transiently control the power level of the input pump laser, such that the gain of the erbium doped fiber 313 is constant at each wavelength in the C-band.

The circulator 34 has a first terminal 341 that is coupled to the variable attenuator 316 for receiving the first-stage amplified optical signal therefrom, a second terminal 342 and a third terminal 343, and outputs the first-stage amplified optical signal at the second terminal 342 thereof. In this embodiment, the circulator 34 has a (power) insertion loss of about 0.6 dB.

The second amplifier stage 35 is coupled to the demultiplexer 314 and the second terminal 342 of the circulator 34 for receiving the bypass pump laser and the first-stage amplified optical signal respectively therefrom. The second amplifier stage 35 uses the bypass pump laser to amplify the first-stage amplified optical signal, and outputs a second-stage amplified optical signal that is related to the first-stage amplified optical signal.

In this embodiment, the second amplifier stage 35 includes a multiplexer 351 and an erbium doped fiber 352.

The multiplexer 351 (e.g., a wavelength division multiplexer) is coupled to the second terminal 342 of the circulator 34 and the demultiplexer 314 for receiving the first-stage amplified optical signal and the bypass pump laser respectively therefrom, and combines the first-stage amplified optical signal and the bypass pump laser to generate a second combined optical signal. In this embodiment, the multiplexer 351 is a coated passive element, and has a (power) insertion loss of about 0.3 dB.

The second combined optical signal has a first component that corresponds to the bypass pump laser, and a second component that corresponds to the first-stage amplified optical signal. The erbium doped fiber 352 is coupled to the multiplexer 351 for receiving the second combined optical signal therefrom, is excited by the first component to amplify the second component, and outputs the second-stage amplified optical signal that includes the first component and a result of the amplification of the second component. In this embodiment, the erbium doped fiber 352 is a short optical fiber that is doped with erbium for amplifying an optical signal, and has a gain that is about 18 dB in the C-band.

The output stage 36 is coupled to the erbium doped fiber 352 for receiving the second-stage amplified optical signal therefrom, and is coupled further to the third terminal 343 of the circulator 34.

When the optical amplifier 3 of this embodiment operates in the high gain range amplification mode, the output stage 36 performs the following: (a) outputting, to the erbium doped fiber 352, a returned optical signal that is related to the second-stage amplified optical signal, so that the second amplifier stage 35 amplifies the returned optical signal and outputs a third-stage amplified optical signal to the second terminal 342 of the circulator 34, and the circulator 34 outputs the third-stage amplified optical signal at the third terminal 343 thereof; (b) receiving the third-stage amplified optical signal from the third terminal 343 of the circulator 34; and (c) outputting the third-stage amplified optical signal to serve as an output optical signal, so that a gain of the output optical signal to the input optical signal is within a first gain range about from 13 dB to 30 dB (i.e., the optical amplifier 3 of this embodiment has a high gain range).

In detail, when the optical amplifier 3 of this embodiment operates in the high gain range amplification mode, the erbium doped fiber 352 is for receiving the returned optical signal from the output stage 36, and uses the first component of the second combined optical signal to amplify the returned optical signal, so as to generate the third-stage amplified optical signal; and the multiplexer 351 receives the third-stage amplified optical signal from the erbium doped fiber 352, and outputs the third-stage amplified optical signal to the second terminal 342 of the circulator 34.

When the optical amplifier 3 of this embodiment operates in the low gain range amplification mode, the output stage 36 outputs the second-stage amplified optical signal to serve as the output optical signal, so that the gain of the output optical signal to the input optical signal is within a second gain range about from 0 dB to 17 dB (i.e., the optical amplifier 3 of this embodiment has a low gain range).

In this embodiment, the output stage 36 includes a switch 361, a gain flattening filter 362, a mirror 363 and an isolator 364.

The switch 361 has a first terminal 3611 that is coupled to the erbium doped fiber 352 for receiving the second-stage amplified optical signal therefrom and for outputting the returned optical signal thereto, a second terminal 3612 that is coupled to the third terminal 343 of the circulator 34 for receiving the third-stage amplified optical signal therefrom, a third terminal 3613 and a fourth terminal 3614. When the optical amplifier 3 of this embodiment operates in the high gain range amplification mode, the switch 361 establishes an optical path between the first and third terminals 3611, 3613 thereof and another optical path between the second and fourth terminals 3612, 3614 thereof, so that the second-stage amplified optical signal is transmitted from the first terminal 3611 to the third terminal 3613 of the switch 361, and the third-stage amplified optical signal is transmitted from the second terminal 3612 to the fourth terminal 3614 of the switch 361. When the output stage 36 operates in the low gain range amplification mode, the switch 361 establishes an optical path between the first and fourth terminals 3611, 3614 thereof, so that the second-stage amplified optical signal is transmitted from the first terminal 3611 to the fourth terminal 3614 of the switch 361. In this embodiment, the switch 361 may be a microelectromechanical system (MEMS) based 2×2 switch or a 2×2 mechanical switch, and has a (power) insertion loss of about 0.6 dB.

It should be noted that the switch 361 is coupled further to the controller 32, and is controlled by a switch control signal generated by the controller 32 to change the establishment of the optical path(s).

The gain flattening filter 362 is coupled to the third terminal 3613 of the switch 361. When the optical amplifier 3 of this embodiment operates in the high gain range amplification mode, the gain flattening filter 362 receives the second-stage amplified optical signal from the third terminal 3613 of the switch 361, and performs gain flattening compensation on the second-stage amplified optical signal to generate a second filtered optical signal. The gain flattening filter 362 cooperates with the erbium doped fiber 352 to provide a gain versus wavelength characteristic that is substantially flat in the C-band. In this embodiment, the gain flattening filter 362 is a coated passive element, and has a (power) insertion loss of about 0.5 dB.

The mirror 363 is coupled to the gain flattening filter 362. When the optical amplifier 3 of this embodiment operates in the high gain range amplification mode, the mirror 363 receives the second filtered optical signal from the gain flattening filter 362, and reflects the second filtered optical signal back to the gain flattening filter 362, so that the second filtered optical signal sequentially undergoes gain flattening pre-compensation by the gain flattening filter 362 and transmission from the third terminal 3613 to the first terminal 3611 of the switch 361 so as to generate the returned optical signal. In this embodiment, the mirror 363 is made from glass coated with a total reflection film, and has a (power) insertion loss of about 0.2 dB.

The isolator 364 has an input terminal that is coupled to the fourth terminal 3614 of the switch 361, and an output terminal that is for outputting the output optical signal. The isolator 364 allows one-way transmission of an optical signal from the input terminal thereof to the output terminal thereof. When the optical amplifier 3 of this embodiment operates in the high gain range amplification mode, the isolator 364 receives the third-stage amplified optical signal from the fourth terminal 3614 of the switch 361, and outputs the third-stage amplified optical signal to serve as the output optical signal. When the optical amplifier 3 of this embodiment operates in the low gain range amplification mode, the isolator 364 receives the second-stage amplified optical signal from the fourth terminal 3614 of the switch 361, and outputs the second-stage amplified optical signal to serve as the output optical signal. It should be noted that the isolator 364 can prevent an external optical signal from entering the switch 361, thereby avoiding deterioration of a signal-to-noise ratio of the second amplifier stage 35 and even deterioration of a signal-to-noise ratio of the first amplifier stage 31. In this embodiment, the isolator 364 is a birefringent crystal based isolator, and has a (power) insertion loss of about 0.35 dB.

It should be noted that, by virtue of the variable attenuator 316 that attenuates the first filtered optical signal by the variable amount, the gain of the output optical signal to the input optical signal is variable.

Figure 4:
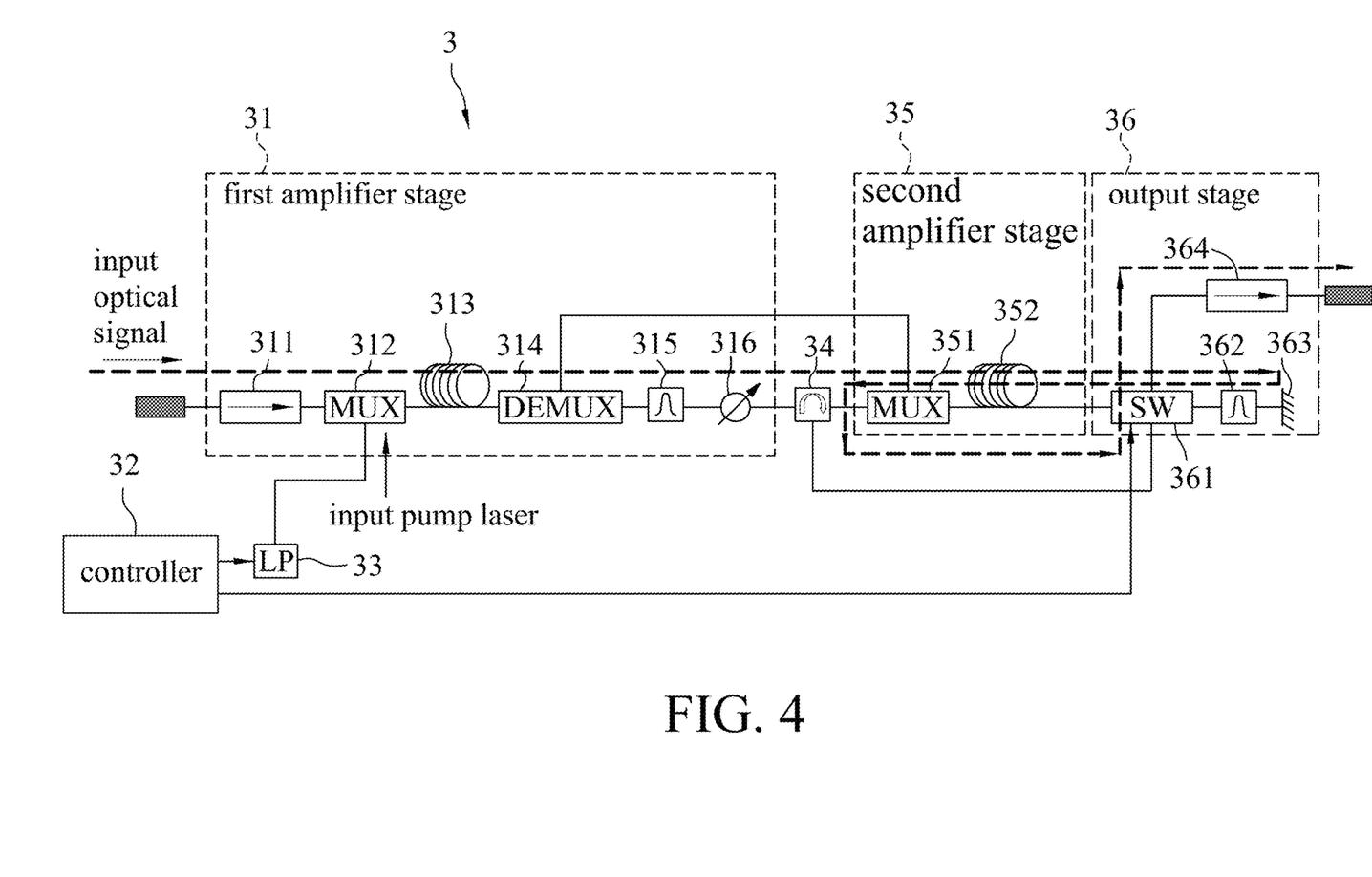
FIG. 4 is a circuit block diagram illustrating a high gain range transmission path that is provided by the embodiment to an input optical signal when the embodiment operates in a high gain range amplification mode.

FIG. 4 illustrates a high gain range transmission path that is provided by the optical amplifier 3 of this embodiment to the input optical signal when operating in the high gain range amplification mode. In FIG. 4, the high gain range transmission path is depicted by a dashed line with arrows showing the transmission direction. As shown in FIG. 4, when the optical amplifier 3 of this embodiment operates in the high gain range amplification mode, the input optical signal sequentially passes through the first amplifier stage 31, the circulator 34, the second amplifier stage 35, the switch 361 and the gain flattening filter 362 to the mirror 363, is reflected by the mirror 363, and then sequentially passes through the gain flattening filter 362, the switch 361, the second amplifier stage 35, the circulator 34, the switch 361 and the isolator 364, so as to generate the output optical signal.

Figure 5:
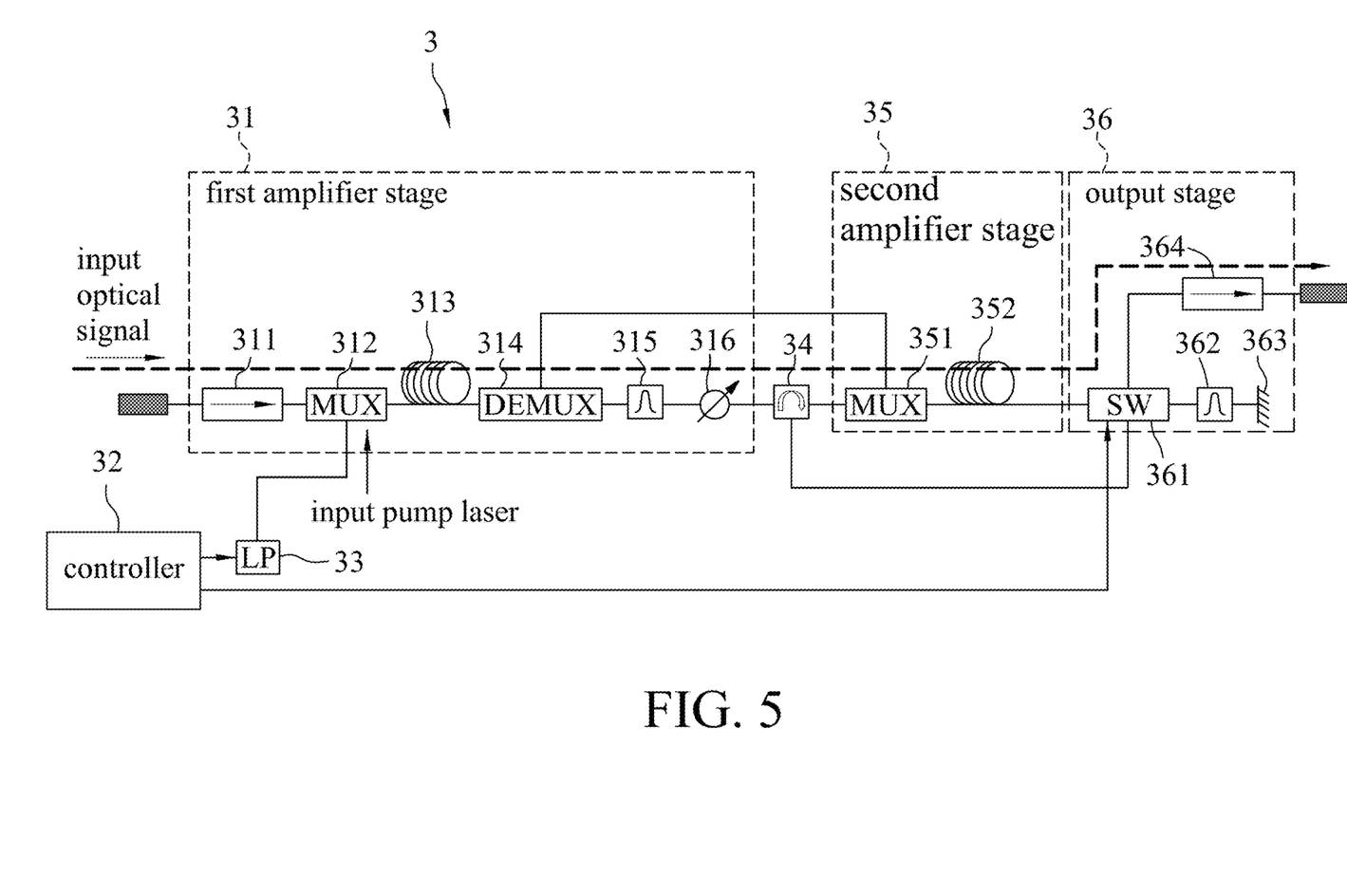
FIG. 5 is a circuit block diagram illustrating a low gain range transmission path that is provided by the embodiment to the input optical signal when the embodiment operates in a low gain range amplification mode.

FIG. 5 illustrates a low gain range transmission path that is provided by the optical amplifier 3 of this embodiment to the input optical signal when operating in the low gain range amplification mode. In FIG. 5, the low gain range transmission path is depicted by a dashed line with an arrow showing the transmission direction. As shown in FIG. 5, when the optical amplifier 3 of this embodiment operates in the low gain range amplification mode, the input optical signal goes through the first amplifier stage 31, the circulator 34, the second amplifier stage 35, the switch 361 and the isolator 362 in sequence, so as to generate the output optical signal.

In view of the above, the optical amplifier 3 of this embodiment has the following advantages.

1. In this embodiment, integration of the circulator 34, the switch 361 and the mirror 363 allows the second amplifier stage 35 to amplify the input optical signal twice when the optical amplifier 3 operates in the high gain range amplification mode. Therefore, as compared to the second conventional optical amplifier 2 (see FIG. 2) that uses the second and third amplifier stages to each amplify the input optical signal once when operating in the high gain range amplification mode, the total number of the elements of the optical amplifier 3 of this embodiment can be reduced, thereby attaining a lower cost and a smaller volume. In detail, the optical amplifier 3 of this embodiment omits a switch, a variable attenuator, two isolators, an erbium doped fiber and a laser pump, but requires a mirror 363 and a circulator 34. When the optical amplifier 3 of this embodiment and the second conventional optical amplifier 2 (see FIG. 2) use the same or similar elements, the cost of the optical amplifier 3 of this embodiment can be reduced by about 15%, and the volume of the optical amplifier 3 of this embodiment can also be reduced.

2. The optical amplifier 3 of this embodiment requires a laser pump 33 to generate an input pump laser. The second conventional optical amplifier 2 (see FIG. 2) requires two laser pumps 13, 22 (see FIG. 2) to respectively generate two input pump lasers. Complexity of transient control on the laser pump(s) increases with increasing total number of the laser pump(s). Therefore, the optical amplifier 3 of this embodiment has lower control complexity as compared to the second conventional optical amplifier 2 (see FIG. 2).

It should be noted that, when the optical amplifier 3 of this embodiment and the second conventional optical amplifier 2 (see FIG. 2) use the same or similar elements, the optical amplifier 3 of this embodiment has amplification efficiencies (e.g., the gain range and noise suppression capability) similar to those of the second conventional optical amplifier 2 (see FIG. 2). In other words, using an amplifier stage to amplify an optical signal twice so as to reduce the total number of elements would not degrade the amplification efficiencies.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. An optical amplifier operable in a first amplification mode, and comprising:
   a first amplifier stage for receiving an input optical signal and an input pump laser that are different from each other in wavelength, using the input pump laser to amplify the input optical signal, and outputting a first-stage amplified optical signal that is related to the input optical signal and a bypass pump laser that is related to the input pump laser;
   a circulator having a first terminal that is coupled to said first amplifier stage for receiving the first-stage amplified optical signal therefrom, a second terminal and a third terminal, and outputting the first-stage amplified optical signal at said second terminal thereof;
   a second amplifier stage coupled to said first amplifier stage and said second terminal of said circulator for receiving the bypass pump laser and the first-stage amplified optical signal respectively therefrom, said second amplifier stage using the bypass pump laser to amplify the first-stage amplified optical signal, and outputting a second-stage amplified optical signal that is related to the first-stage amplified optical signal; and
   an output stage coupled to said second amplifier stage for receiving the second-stage amplified optical signal therefrom, and coupled further to said third terminal of said circulator;
   wherein, when said optical amplifier operates in the first amplification mode, said output stage outputs, to said second amplifier stage, a returned optical signal that is related to the second-stage amplified optical signal, so that said second amplifier stage amplifies the returned optical signal and outputs a third-stage amplified optical signal to said second terminal of said circulator, and said circulator outputs the third-stage amplified optical signal at said third terminal thereof, receives the third-stage amplified optical signal from said third terminal of said circulator, and outputs the third-stage amplified optical signal to serve as an output optical signal, so that a gain of the output optical signal to the input optical signal is within a first gain range.

2. The optical amplifier of claim 1, further comprising a laser pump that is coupled to said first amplifier stage, and that outputs the input pump laser for receipt by said first amplifier stage.

3. The optical amplifier of claim 1, wherein said output stage includes a switch that has a first terminal coupled to said second amplifier stage for receiving the second-stage amplified optical signal therefrom and for outputting the returned optical signal thereto, and a second terminal coupled to said third terminal of said circulator for receiving the third-stage amplified optical signal therefrom.

4. The optical amplifier of claim 3, wherein said switch further has a third terminal, and said output stage further includes a mirror that is coupled to said third terminal of said switch for reflecting an optical signal therefrom.

5. The optical amplifier of claim 4, wherein said switch further has a fourth terminal, and said output stage further includes an isolator that has an input terminal coupled to said fourth terminal of said switch, and an output terminal for outputting the output optical signal, and that allows one-way transmission of an optical signal from said input terminal thereof to said output terminal thereof.

6. The optical amplifier of claim 5, wherein, when said optical amplifier operates in the first amplification mode, said switch establishes an optical path between said first and third terminals thereof and another optical path between said second and fourth terminals thereof.

7. The optical amplifier of claim 5, wherein said switch is a 2×2 switch.

8. The optical amplifier of claim 4, wherein said output stage further includes a gain flattening filter that is coupled between said third terminal of said switch and said mirror, and that performs gain flattening compensation on optical signals from said third terminal of said switch and said mirror.

9. The optical amplifier of claim 1, wherein said first amplifier stage includes an isolator that has an input terminal for receiving the input optical signal, and an output terminal, and that allows one-way transmission of the input optical signal from said input terminal thereof to said output terminal thereof.

10. The optical amplifier of claim 9, wherein said first amplifier stage further includes a multiplexer that is coupled to said output terminal of said isolator for receiving the input optical signal therefrom, that is for further receiving the input pump laser, and that combines the input optical signal and the input pump laser to generate a combined optical signal.

11. The optical amplifier of claim 10, wherein said first amplifier stage further includes an erbium doped fiber that is coupled to said multiplexer for receiving the combined optical signal therefrom, that uses a first component of the combined optical signal corresponding to the input pump laser to amplify a second component of the combined optical signal corresponding to the input optical signal, and that outputs a boosted optical signal including the first component of the combined optical signal and a result of the amplification of the second component of the combined optical signal.

12. The optical amplifier of claim 11, wherein said first amplifier stage further includes a demultiplexer that is coupled to said erbium doped fiber for receiving the boosted optical signal therefrom, that is coupled further to said second amplifier stage, and that splits the boosted optical signal into a split optical signal corresponding to the result of the amplification of the second component of the combined optical signal, and the bypass pump laser corresponding to the first component of the combined optical signal and for receipt by said second amplifier stage.

13. The optical amplifier of claim 12, wherein said first amplifier stage further includes a variable attenuator that is coupled to said demultiplexer for receiving the split optical signal therefrom, that is coupled further to said first terminal of said circulator, and that attenuates the split optical signal by a variable amount to generate the first-stage amplified optical signal for receipt by said first terminal of said circulator.

14. The optical amplifier of claim 13, wherein said first amplifier stage further includes a gain flattening filter that is coupled between said demultiplexer and said variable attenuator, and that performs gain flattening compensation on the split optical signal.

15. The optical amplifier of claim 1, wherein said second amplifier stage includes a multiplexer that is coupled to said second terminal of said circulator and said first amplifier stage for receiving the first-stage amplified optical signal and the bypass pump laser respectively therefrom, and that combines the first-stage amplified optical signal and the bypass pump laser to generate a combined optical signal.

16. The optical amplifier of claim 15, wherein said second amplifier stage further includes an erbium doped fiber that is coupled to said multiplexer for receiving the combined optical signal therefrom, that is coupled further to said output stage, that uses a first component of the combined optical signal corresponding to the bypass pump laser to amplify a second component of the combined optical signal corresponding to the first-stage amplified optical signal, and that outputs, for receipt by said output stage, the second-stage amplified optical signal including the first component of the combined optical signal and a result of the amplification of the second component of the combined optical signal.

17. The optical amplifier of claim 16, wherein, when said optical amplifier operates in the first amplification mode:

said erbium doped fiber is for receiving the returned optical signal from said output stage, and uses the first component of the combined optical signal to amplify the returned optical signal, so as to generate the third-stage amplified optical signal; and said multiplexer receives the third-stage amplified optical signal from said erbium doped fiber, and outputs the third-stage amplified optical signal to said second terminal of said circulator.

18. The optical amplifier of claim 1, further operable in a second amplification mode, wherein:

when said optical amplifier operates in the second amplification mode, said output stage outputs the second-stage amplified optical signal to serve as the output optical signal, so that the gain of the output optical signal to the input optical signal is within a second gain range.

\* \* \* \* \*